US012561378B2

(12) United States Patent
Marlow-Thomas et al.

(10) Patent No.: US 12,561,378 B2
(45) Date of Patent: Feb. 24, 2026

(54) USER INTERFACE FOR CONFIGURATION AND STORAGE OF HIERARCHICAL DATA

(71) Applicant: Smartly.io Solutions Oy, Helsinki (FI)

(72) Inventors: Oliver John Basil Marlow-Thomas, London (GB); Edward Simon Lyon, London (GB); Anton Huzhov, Chernihiv (UA); Damir Grandich, London (GB)

(73) Assignee: Smartly.IO Solutions OY, Helsinki (FI)

( * ) Notice: Subject to any disclaimer, the term of this patent is extended or adjusted under 35 U.S.C. 154(b) by 0 days.

(21) Appl. No.: 18/567,095

(22) PCT Filed: Jul. 11, 2022

(86) PCT No.: PCT/US2022/036651
§ 371 (c)(1),
(2) Date: Dec. 5, 2023

(87) PCT Pub. No.: WO2023/287688
PCT Pub. Date: Jan. 19, 2023

(65) Prior Publication Data
US 2024/0273144 A1 Aug. 15, 2024

Related U.S. Application Data

(60) Provisional application No. 63/270,814, filed on Oct. 22, 2021, provisional application No. 63/220,978, filed on Jul. 12, 2021.

(51) Int. Cl.
G06F 16/00 (2019.01)
G06F 3/04845 (2022.01)
G06F 16/904 (2019.01)

(52) U.S. Cl.
CPC ........ G06F 16/904 (2019.01); G06F 3/04845 (2013.01)

(58) Field of Classification Search
CPC ........................... G06F 16/904; G06F 3/04845
See application file for complete search history.

(56) References Cited

U.S. PATENT DOCUMENTS 11,669,347 B2 * 6/2023 Cartan .................. G06F 11/323
715/704
2005/0278162 A1 12/2005 Ciolfi et al.
(Continued)

OTHER PUBLICATIONS

Andrzej Maciot, "An Application of Rule-Based Tool In Attributive Logic For Business Rules Modeling," Expert Systems with Applications, vol. 34, Issue 3, Apr. 2008, pp. 1825-1836, Elsevier, www.sciencedirect.com. (Year: 2008).*

*Primary Examiner* — Cheryl Lewis
(74) *Attorney, Agent, or Firm* — Ryan, Mason & Lewis, LLP

(57) ABSTRACT

Techniques are provided for configuration and storage of hierarchical data. One method comprises providing a user interface to configure different variants, wherein a configuration of a given variant comprises a specification of signals associated with the given variant, wherein a given signal comprises one or more rules; obtaining one or more representations of user interactions with the user interface to configure the given variant; initiating an update of at least one database table comprising one or more records associated with the given variant based on the one or more representations of the user interactions, wherein the at least one database table stores rule values specified for the one or more signals associated with the given variant as attributes of the given variant; and initiating an automated action using (Continued)

the at least one database table. A given variant may be, for example, a content-related variant or a product-related variant.

20 Claims, 13 Drawing Sheets

(56) References Cited

U.S. PATENT DOCUMENTS

| | | | |
|---|---|---|---|
| 2006/0259509 A1* | 11/2006 | Stolte | G06F 40/177 |
| | | | 707/999.102 |
| 2008/0109458 A1 | 5/2008 | Cosby et al. | |
| 2013/0268474 A1* | 10/2013 | Nizzari | G16B 20/10 |
| | | | 706/46 |
| 2014/0109043 A1 | 4/2014 | Bolotnikoff et al. | |

* cited by examiner

230

| Variant | Signals | | Variant Variables |
| --- | --- | --- | --- |
| | Signal 1 | Signal 2 | |
| Alpha | 1, 2 | | |
| Beta | 2, 3 | A, B | |
| Gamma | | A, B, C | |
| Delta | 1, 2, 3 | A, B, C | |
| Epsilon | 2, 3 | | |

| Permutation ID | Variant Name | Signal 1 | Signal 2 | Variant Variables | Hash Value Identifier |
|---|---|---|---|---|---|
| 1 | Alpha | 1 | | abc | |
| 2 | Alpha | 2 | | abc | |
| 3 | Beta | 2 | A | bcd | |
| 4 | Beta | 3 | A | bcd | |
| 5 | Beta | 2 | B | bcd | |
| 6 | Beta | 3 | B | bcd | |
| 7 | Gamma | | | cde | |
| 8 | Gamma | | A | cde | |
| 9 | Gamma | | B | cde | |
| 10 | Gamma | | C | cde | |
| 11 | Delta | 1 | A | def | |
| 12 | Delta | 2 | A | def | |
| 13 | Delta | 3 | A | def | |
| 14 | Delta | 1 | B | def | |
| 15 | Delta | 2 | B | def | |
| 16 | Delta | 3 | B | def | |
| 17 | Delta | 1 | C | def | |
| 18 | Delta | 2 | C | def | |
| 19 | Delta | 3 | C | def | |
| 20 | Epsilon | 2 | | efg | |
| 21 | Epsilon | 3 | | efg | |

FIG. 2C

Figure 5:
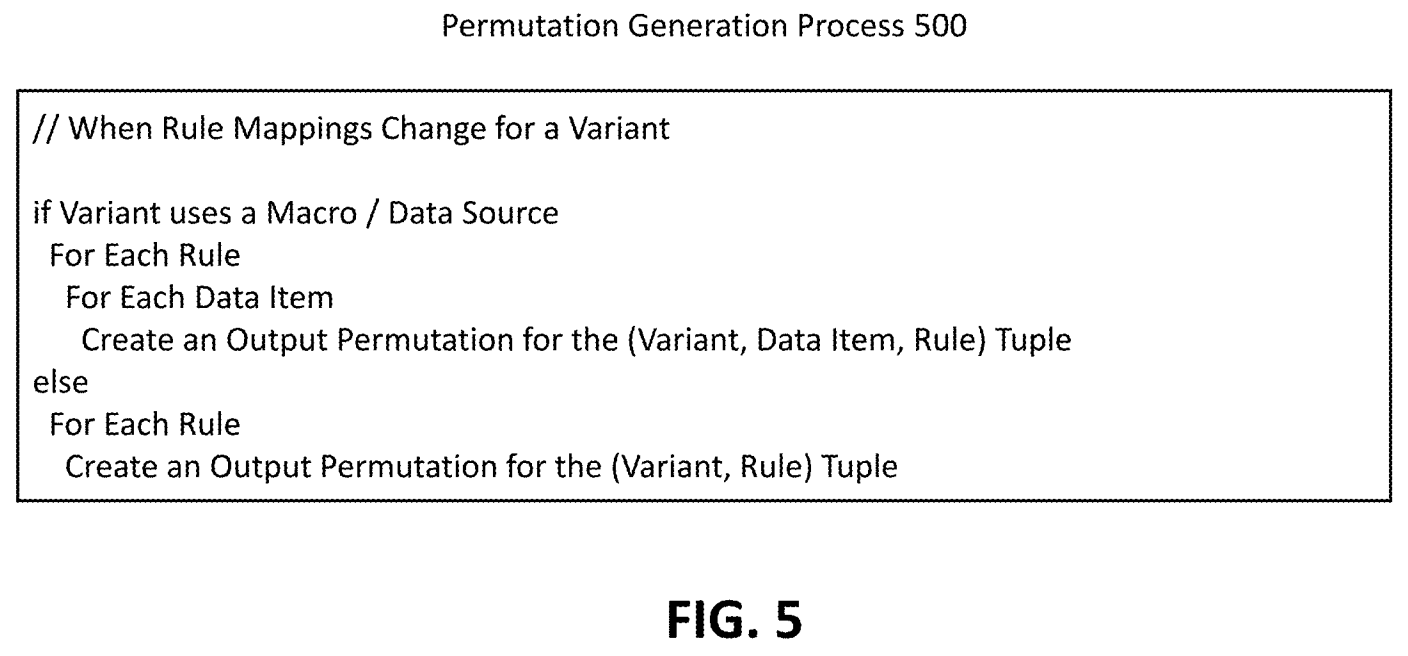

Permutation Generation Process 500

// When Rule Mappings Change for a Variant if Variant uses a Macro / Data Source
    For Each Rule
        For Each Data Item
            Create an Output Permutation for the (Variant, Data Item, Rule) Tuple
else
    For Each Rule
        Create an Output Permutation for the (Variant, Rule) Tuple

| On/Off | Variant 710 Variant Name | Perform. 720 CTR | Signals 730 Segment | Signals 730 Schedule | Frame 740 Background | Frame 740 Headline | Frame 740 Image | Frame 740 Image2 | Frame 740 Sub-headline | Frame 740 Sub-headline 2 |
|---|---|---|---|---|---|---|---|---|---|---|
| ⬭ | Alpha — 300x600, 970x250 | No Data | 1, 2 | | Image A | Variant "Alpha" Headline | Image V | Image j | LOCKDOWN SALE | Buy One, Get One Free |
| ⬭ | Beta •Active 2/2 — 300x600, 970x250 | No Data | 2 | A, B | Image B | Variant B Headline 2 | Image W | Image k | ON SALE NOW | Buy One, Get One Free |
| ⬭ | Gamma Fallback •Active 2/2 — 300x600, ... | No Data | 1 | A, B, C | Image C | Variant C Headline | Image X | Image l | GREAT DEALS ONLINE | Buy One, Get One Free |
| ⬭ | Delta — 300x600, 970x250 | No Data | 1, 2 | | Image D | Variant "Delta" headline | Image Y | Image m | GREAT DEALS ONLINE | Buy One, Get One Free |
| ⬭ | Epsilon — 300x600, 970x250 | No Data | 2 | | Image E | Just Changed Name | Image Z | Image n | GREAT DEALS ONLINE | Buy One, Get One Free |

FIG. 7

Schedule (Signal 2)
Mapping Database 900

| Schedule Identifier | Schedule Description |
|---|---|
| A | |
| B | |
| C | |

FIG. 9

User Segment (Signal 1)
Mapping Database 800

| Segment Identifier | Segment Description |
|---|---|
| 1 | |
| 2 | |
| 3 | |

FIG. 8

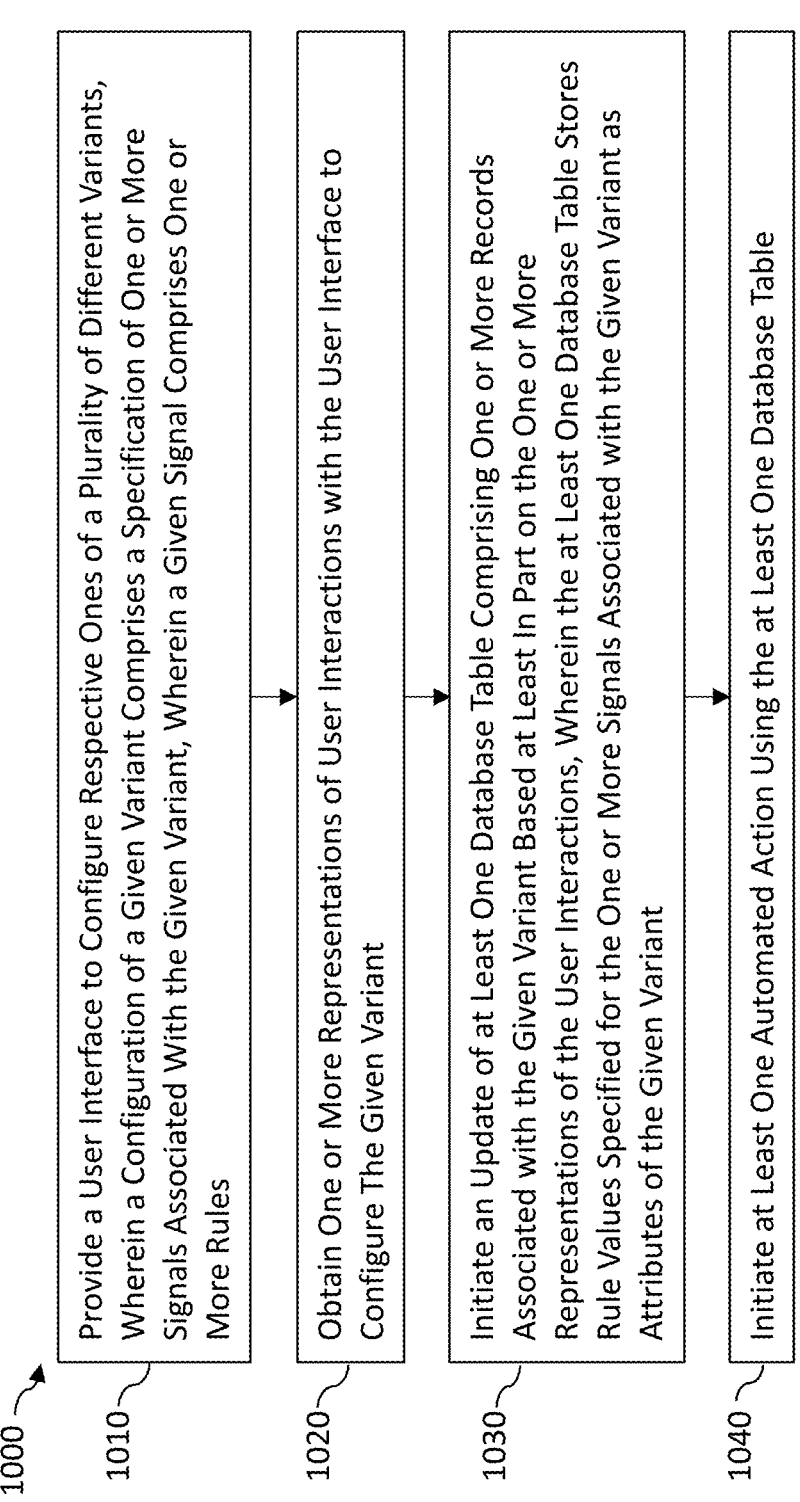

1000

1010 — Provide a User Interface to Configure Respective Ones of a Plurality of Different Variants, Wherein a Configuration of a Given Variant Comprises a Specification of One or More Signals Associated With the Given Variant, Wherein a Given Signal Comprises One or More Rules 1020 — Obtain One or More Representations of User Interactions with the User Interface to Configure The Given Variant 1030 — Initiate an Update of at Least One Database Table Comprising One or More Records Associated with the Given Variant Based at Least In Part on the One or More Representations of the User Interactions, Wherein the at Least One Database Table Stores Rule Values Specified for the One or More Signals Associated with the Given Variant as Attributes of the Given Variant 1040 — Initiate at Least One Automated Action Using the at Least One Database Table

FIG. 10

Figure 12:
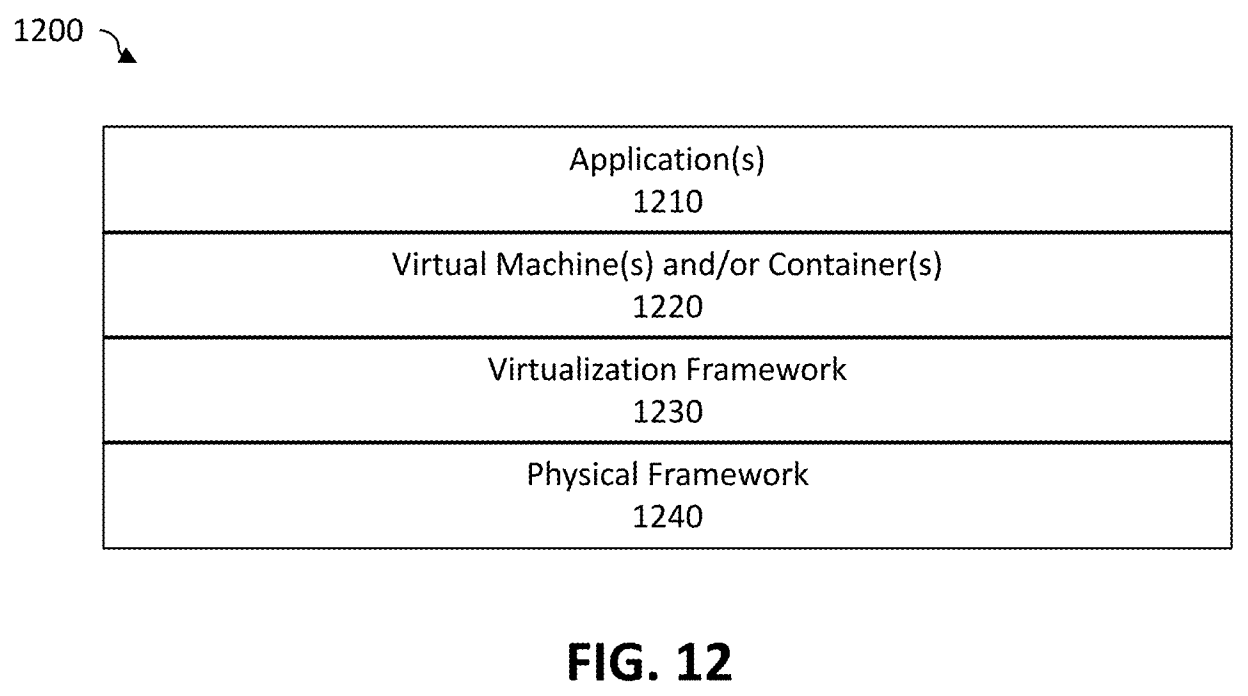

Application(s)
1210

Virtual Machine(s) and/or Container(s)
1220

Virtualization Framework
1230

Physical Framework
1240

USER INTERFACE FOR CONFIGURATION AND STORAGE OF HIERARCHICAL DATA

CROSS-REFERENCE TO RELATED APPLICATION(S)

The present application claims priority to International Patent Application No. PCT/US22/36651, filed Jul. 11, 2022, entitled "User Interface for Configuration and Storage of Hierarchical Data;" U.S. Provisional Patent Application Ser. No. 63/270,814, filed Oct. 22, 2021, entitled "User Interface and Data Management Systems for Arranging Complex Hierarchical Data Relationships in a Computational Environment;" and U.S. Provisional Patent Application Ser. No. 63/220,978, filed Jul. 12, 2021, entitled "Managing User Data Arranged in Complex Hierarchical Data Relationships in a Computational Environment," and each incorporated by reference herein in its entirety.

FIELD

The field relates generally to information processing techniques, and more particularly, to techniques for the management of data.

BACKGROUND

There are a number of challenges involved with the configuration and storage of data that can lead to duplication and other inefficiencies. Decision trees are often employed to represent hierarchical data. Information in such decision trees, however, is often duplicated across multiple branches of a given decision tree. In addition, multiple paths of a decision tree leading to the same leaf node may also be a source of duplication.

A need exists for improved techniques for configuring and storing hierarchical data.

SUMMARY

In one embodiment, a method comprises providing a user interface to configure respective ones of a plurality of different variants, wherein a configuration of a given variant comprises a specification of one or more signals associated with the given variant, wherein a given signal comprises one or more rules; obtaining one or more representations of user interactions with the user interface to configure the given variant; initiating an update of at least one database table comprising one or more records associated with the given variant based at least in part on the one or more representations of the user interactions, wherein the at least one database table stores rule values specified for the one or more signals associated with the given variant as attributes of the given variant; and initiating at least one automated action using the at least one database table.

In some embodiments, the given variant comprises one or more variant variables comprising characteristics of the given variant and wherein the at least one database table stores values specified for the one or more variant variables associated with the given variant as attributes of the given variant. A function may be applied to each permutation of the given variant, signal configuration for the respective permutation, rule configuration for the respective permutation and variant variable configuration for the respective permutation, and wherein a value generated by the function is stored in the at least one database table as an identifier of the respective permutation. The one or more of the variant variables may be automatically populated from at least one data feed referenced using one or more macro programs and/or the user interface may be employed to configure the one or more variant variables. One or more selection options presented to at least one user in the user interface for configuring the one or more variant variables may be constrained based at least in part on the configuration by the at least one user of one or more of the one or more signals and the one or more rules.

In one or more embodiments, the one or more of the rules are configured by importing one or more data objects using an application programming interface (API) of a third-party system. The one or more data objects may have corresponding human-readable identifiers and at least a portion of at least some of the human-readable identifiers may be reduced based at least in part on one or more informational content thresholds.

In at least some embodiments, the given variant comprises a content item, wherein the content item is presented to an audience based on a configuration of a user segment signal and a configuration of a schedule signal, and wherein one or more variant variables comprise characteristics of the content elements of the content item.

Other illustrative embodiments include, without limitation, systems and processor-readable storage media comprising program code.

BRIEF DESCRIPTION OF THE DRAWINGS

FIGS. 2B and 2C illustrate sample tables that may be employed to manage hierarchical data in accordance with exemplary embodiments of the disclosure;

FIG. 5 illustrates exemplary pseudo code for a permutation generation process, according to one embodiment of the disclosure;

FIG. 7 illustrates an exemplary user interface for configuration and storage of content-related variant data, according to one embodiment of the disclosure;

FIGS. 8 and 9 comprise sample tables that may be employed to record user segment data and schedule data, respectively, related to the user interface of FIG. 7 in accordance with exemplary embodiments of the disclosure;

FIG. 10 is a flow diagram illustrating an exemplary implementation of a process for configuration and storage of hierarchical data, according to an embodiment of the disclosure;

FIG. 12 illustrates an exemplary cloud-based processing platform in which cloud-based infrastructure and/or cloud-based services can be used to configure and store hierarchical data, according to an exemplary embodiment.

DETAILED DESCRIPTION

Illustrative embodiments of the present disclosure will be described herein with reference to exemplary processing devices. The disclosure is not restricted to the particular illustrative configurations described herein, as would be apparent to a person of ordinary skill in the art. One or more embodiments of the disclosure provide methods, apparatus and processor-readable storage media for configuration and storage of hierarchical data.

As noted above, decision trees are often employed to represent hierarchical data. One or more aspects of the disclosure recognize that there are challenges associated with building a computer system and user interface to handle the process flow to generate a decision tree to represent hierarchical data. For example, information may be duplicated with each branch of a decision tree, which may increase exponentially, creating challenges with, for example, usability, scalability and performance. Further, multiple paths of a decision tree leading to the same leaf node (e.g., a result) may also be a source of duplication.

In addition, if there are additional dimensions to manage at the leaf node level (for example, if the leaf nodes are themselves combinations of variables such as content in a template), then the above challenges typically make it necessary to move the configuration of the leaf nodes into a separate user interface to define and manage the leaf node variables due to constraints of available space and user interface complexity.

In one or more embodiments, improved techniques are provided for configuration and storage of hierarchical data, such as variant data and the characteristics of each variant.

Figure 1:
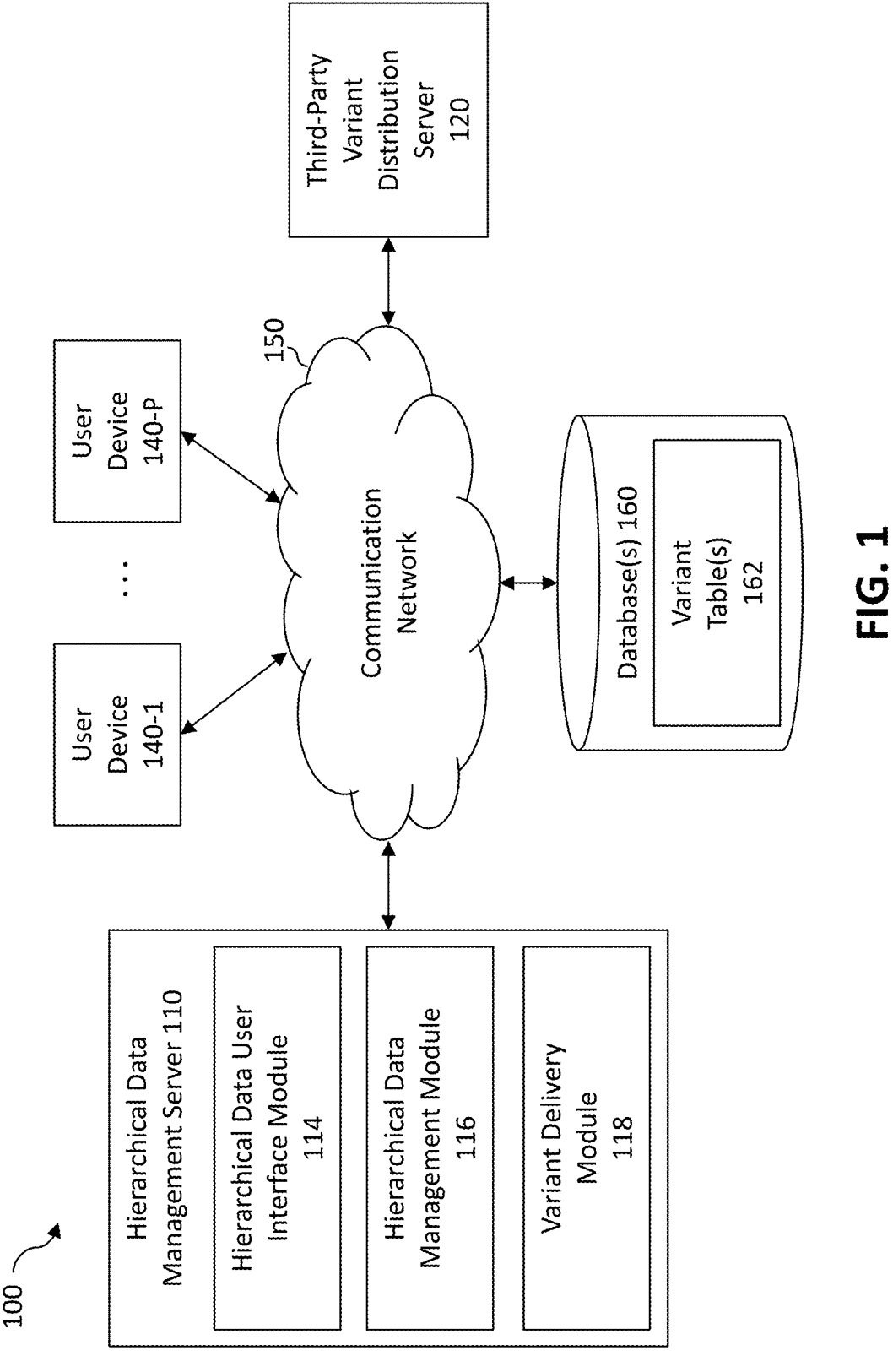
FIG. 1 illustrates an information processing environment in accordance with an exemplary embodiment of the disclosure.

FIG. 1 illustrates an information processing environment 100 in accordance with an exemplary embodiment of the disclosure. The information processing environment 100 comprises a hierarchical data management server 110, a third-party variant distribution server 120, one or more user devices 140-1 through 140-P and one or more databases 160. The user devices 140 may comprise, for example, computing devices, such as computers, mobile phones or tablets. The term "user" as used herein shall be broadly interpreted so as to encompass, for example, human, hardware, software or firmware entities, and/or various combinations of such entities.

In the example of FIG. 1, the hierarchical data management server 110, the third-party variant distribution server 120 and user devices 140 are coupled to a communication network 150 (e.g., a portion of a larger computer network, such as the Internet, a telephone network, a cable network, a cellular network, a wide area network, a local area network, or various combinations of at least portions of such networks).

One or more of the hierarchical data management server 110, the third-party variant distribution server 120 and the user devices 140 comprise processing devices each having a processor and a memory that may optionally employ virtualized infrastructure, as discussed further below in conjunction with FIGS. 11 and 12. Such processing devices can illustratively include particular arrangements of compute, storage and network resources (each potentially employing virtualized infrastructure). The processor may comprise, for example, a microprocessor, a microcontroller, a central processing unit (CPU), an application-specific integrated circuit (ASIC), a field-programmable gate array (FPGA)

and/or other processing circuitry. The memory may comprise a random access memory (RAM), a read-only memory (ROM) and/or other types of processor-readable storage media storing executable program code or other software programs.

In the example of FIG. 1, the exemplary hierarchical data management server 110 comprises a hierarchical data user interface module 114, a hierarchical data management module 116 and a variant delivery module 118. The term module as used herein denotes any combination of software, hardware, and/or firmware that can be configured to provide the corresponding functionality of the module. In one or more embodiments, the hierarchical data user interface module 114 may provide a user interface for configuration and storage of hierarchical data, such as the exemplary user interface discussed further below in conjunction with FIG. 7. The hierarchical data management module 116 may process one or more user interactions with the user interface of FIG. 7 to initiate an update of one or more data records of the databases 160 (such as the tables of FIGS. 2B and 2C). The variant delivery module 118 processes one or more of the tables of FIGS. 2B and 2C to provide variant data to, for example, a third-party variant distribution server 120, such as an advertising server (e.g., Google Ad Manager or the Facebook (Meta) Ads Manager), for further processing by the third-party variant distribution server 120, as discussed further below.

The variant delivery module 118 may provide the variant data to the third-party variant distribution server 120 in at least some embodiments as a set of instructions to be processed and delivered by the third-party variant distribution server 120. For example, the variant delivery module 118 may provide the third-party variant distribution server 120 with a table comprising the variant data together for one or more variants with templates related to the respective variant variables (e.g., creative templates). More generally, the variant delivery module 118 provides the variant data to the third-party variant distribution server 120 in a format that is ingestible by the third-party variant distribution server 120 (or another platform).

Modules 114, 116, 118, or portions thereof, may be implemented at least in part in the form of software that is stored in memory and executed by a processor. The hierarchical data management server 110 may include one or more additional modules or other components (not shown in FIG. 1) typically found in conventional implementations of such server devices. For example, one or more different processing devices and/or memory components may be employed to implement different ones of modules 114, 116, 118, or portions thereof.

The arrangement of modules 114, 116, 118 illustrated in the hierarchical data management server 110 and/or elements of the third-party variant distribution server 120 of FIG. 1 are presented for illustration, and alternative implementations may be used in other embodiments. For example, the functionality provided by modules 114, 116 and/or 118 of the hierarchical data management server 110, in other embodiments, may be combined into one module, or separated across multiple modules.

In the example of FIG. 1, the hierarchical data management server 110 and/or the third-party variant distribution server 120 can have one or more associated databases 160 configured to store information related, for example, to variants being configured and stored using the disclosed hierarchical data techniques. In some embodiments, characteristics of each variant are stored in one or more data records as attributes of the respective variant. For example, one or more variant tables 162 may be maintained comprising one or more records for each variant, wherein the one or more records comprise attributes of a corresponding variant. While such information is stored in a single database 160 in the example of FIG. 1, an additional or alternative instance of the database 160, or portions thereof, may be employed in other embodiments.

The hierarchical data management server 110, the third-party variant distribution server 120 and/or the user devices 140 may comprise one or more associated input/output devices (not shown), which illustratively comprise keyboards, displays or other types of input/output devices in any combination. Such input/output devices can be used, for example, to support one or more user interfaces to a user device 140, as well as to support communication between the third-party variant distribution server 120 and/or other related systems and devices not explicitly shown.

The particular arrangement of elements shown in FIG. 1 for configuration and storage of hierarchical data is presented by way of example only, and additional or alternative elements may be used in other embodiments.

Figure 2A:
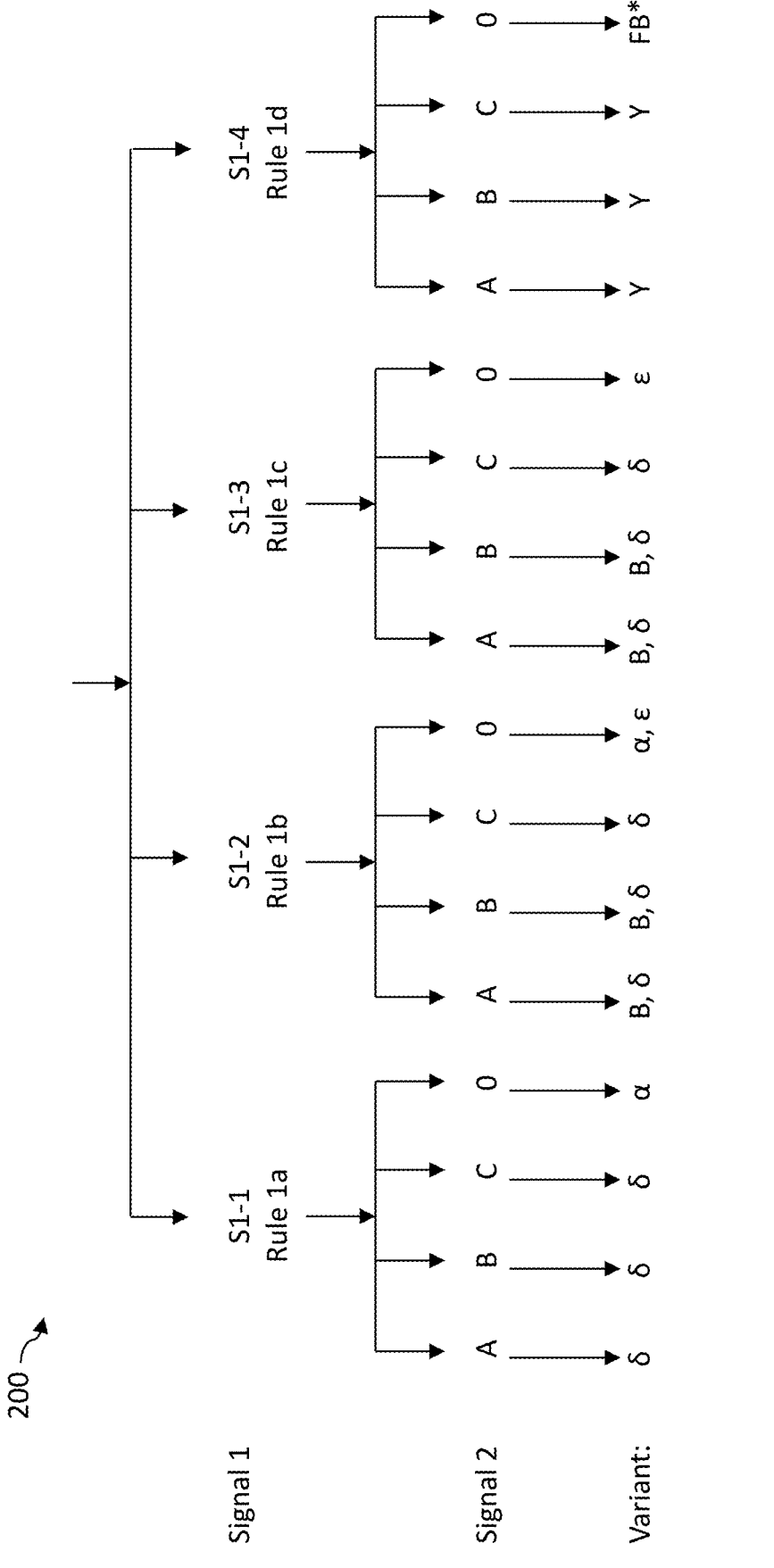
FIG. 2A illustrates a decision tree that may be employed to manage hierarchical data.

FIG. 2A illustrates a decision tree 200 that may be employed to manage hierarchical data. The exemplary decision tree 200, sometimes referred to as a gated decision tree, is typically comprised of multiple categories of signals (or variables), with each signal comprising multiple rules (or additional variables), where each path through the decision tree concludes with one or more variants. In the example of FIG. 2A, signal 1, comprising a first hierarchical level of the decision tree 200 below the root node, may evaluate a signal S1-1, according to a rule 1*a*; a signal S1-2, according to a rule 1*b*; a signal S1-3, according to a rule 1*c*; or a signal S1-4, according to a rule 1*d*. In addition, a signal 2, comprising a second hierarchical level of the decision tree 200, may evaluate a value of A, B, C or 0 associated with one of the signal S1 options, which maps to a particular variant at the leaf node level.

One approach uses a configurable interface in which the user builds out the decision tree 200 node-by-node, with the logic gates and decisions being described by connectors, and the prioritization determined by the sequencing of the different layers of the decision tree 200, whereby the first hierarchical level may have a priority of one, and so on.

One or more aspects of the disclosure recognize that there are challenges associated with building a computer system and user interface to handle the process flow to generate the decision tree 200. For example, information may be duplicated with each branch (e.g., Signal 2 data in FIG. 2A is repeated four times). With each incremental signal, information has to be duplicated exponentially, creating challenges with, for example, usability, scalability and performance.

In addition, if multiple paths lead to the same variant result, there is also duplication there as well (e.g., when each variant appears at the end of multiple branches of the decision tree 200). Further, if the process extends to managing additional dimensions at the variant level as well (for example, if the variants are themselves combinations of variables such as content in a template), then the above challenges typically make it necessary to move the configuration of the variants into a separate user interface due to constraints of available space and user interface complexity.

Thus, the approach of FIG. 2A typically requires a separate mechanism for defining and managing the variant variables, in other words the characteristics of each variant. For example, if the variants are different processes, then the process steps need to be defined in a separate interface, thus creating further complexity for users.

In one or more embodiments, techniques are provided for configuration and storage of hierarchical data, such as variant data and the characteristics of each variant. The challenge is in how to remove the complexity and lack of scalability of that framework but retain the same outcome of the process flow.

FIGS. 2B and 2C illustrate sample tables that may be employed to manage hierarchical data, such as variant data, in accordance with exemplary embodiments of the disclosure. In the example of FIG. 2B, one data record is maintained in the table 230 for each different variant, such as variants Alpha, Beta, Gamma, Delta and Epsilon. The characteristics of each variant are stored as attributes of the respective variant, such as Signal 1 attributes, Signal 2 attributes, and zero or more variant variables. Each variant in the table 230 of FIG. 2B may have multiple permutations, as discussed further below. The table 230 of FIG. 2B is an alternate representation of the decision tree 200 of FIG. 2A. The various options for each signal (1 and 2) in the table 230 of FIG. 2B are discussed further below in conjunction with FIGS. 8 and 9, for exemplary content-related variants.

In the example of FIG. 2C, one or more data records are maintained in the table 250 for each different variant, such as variants Alpha, Beta, Gamma, Delta and Epsilon. The table 250 maintains a separate data record for each different permutation, identified by a permutation identifier, of a given variant. The characteristics of each variant are stored as attributes of the respective variant, such as Signal 1 attributes, Signal 2 attributes, and zero or more variant variables. In addition, a substantially unique hash value identifier is also maintained in the table 250 for each different permutation. The hash value identifier may be obtained in some embodiments by applying a hash function to the values for the permutation identifier, variant names, signal 1, signal 2 and the variant variables. In some embodiments, the hash value identifier for a given permutation will change if any of the components (inputs) applied to the hash function are changed. Among other benefits, the hash value identifier for a given permutation allows performance data or other metadata received, for example, from a third-party variant distribution server 120 to be mapped back to the corresponding permutation (e.g., row of the table 250). For example, the hash value identifiers for two permutations for a given variant may be utilized to compare the performance data for each permutation of the given variant (e.g., for the Beta variant, permutation identifiers 3 and 4 performed better than permutation identifiers 5 and 6).

The table 230 of FIG. 2B may be considered in some embodiments as a summary view of the table 250 of FIG. 2C. As noted above, the table 250 comprises a separate row for each permutation of a variant, and the table 230 comprises one row per variant. In at least some embodiments, the variant variables are typically the same for each different variant (e.g., for each content item) and correlate with metadata of the different variant.

The data records in the tables of FIGS. 2B and/or 2C may be generated, configured and stored, for example, using the user interface of FIG. 7, as discussed further below. In some embodiments, the tables of FIGS. 2B and/or 2C can be queried to identify a given variant or variant permutation that satisfies attributes of the query.

Figure 3:
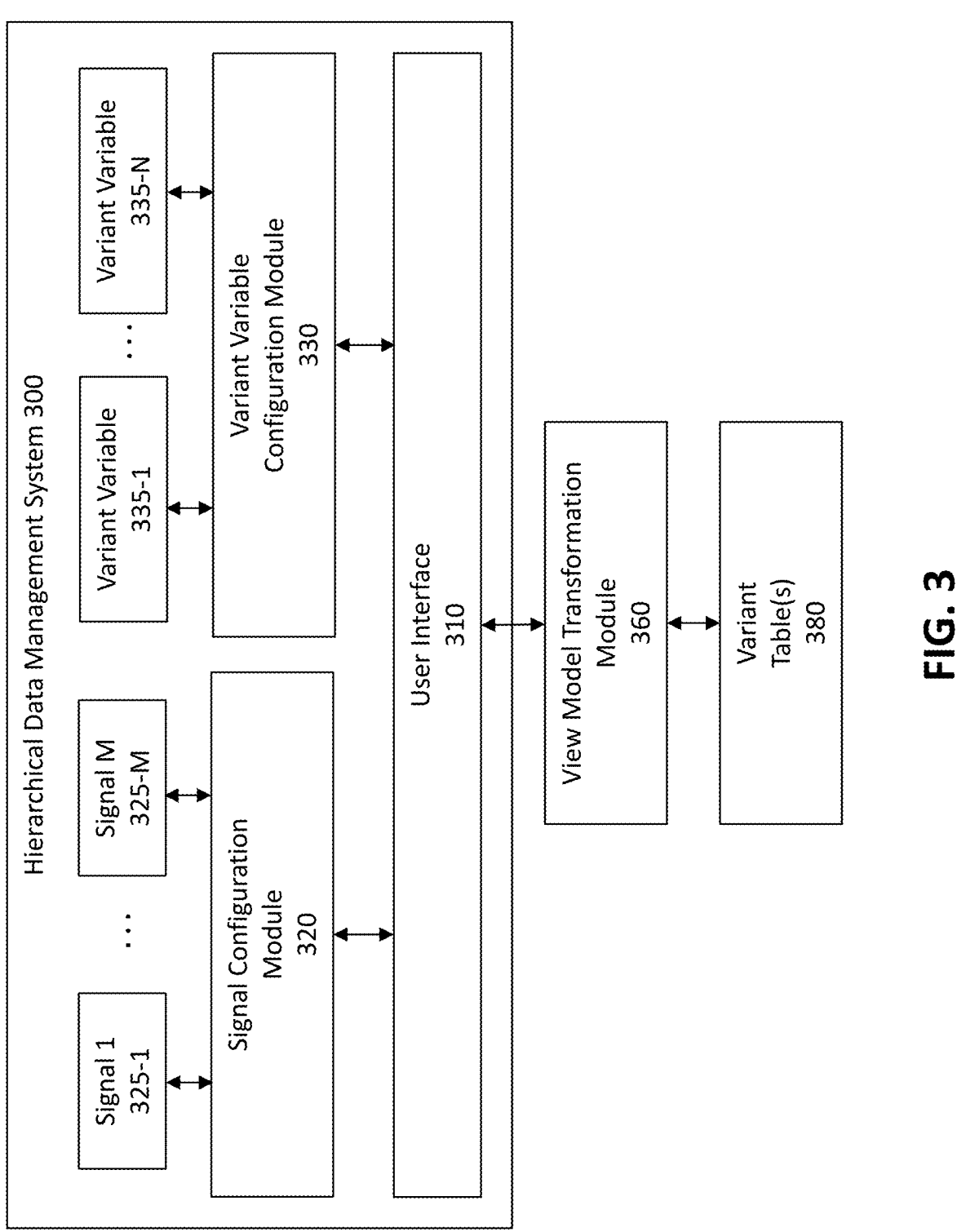
FIG. 3 illustrates a hierarchical data management system in accordance with an exemplary embodiment of the disclosure.

FIG. 3 illustrates a hierarchical data management system 300 in accordance with an exemplary embodiment of the disclosure. In the example of FIG. 3, the hierarchical data management system 300 comprises a user interface 310 that allows a user to configure a given variant, in a front-end, by specifying: (i) one or more signals 325-1 through 325-M associated with the given variant via a signal configuration module 320; and (ii) one or more variant variables 335-1 through 335-N comprising characteristics of the given variant via a variant variables configuration module 330. For example, a user may configure the one or more signals 325-1 through 325-M by specifying one or more rules or rule values for each signal.

In some embodiments, the user interface 310 receives user interaction signals with the user interface 310 to configure the given variant. The user interface 310 initiates an update by a view model transformation module 360 of one or more data records associated with the given variant based on the received user interaction signals. The rule values specified for the one or more signals 325-1 through 325-M associated with the given variant are stored in the one or more data records of one or more variant tables 380 as attributes of the given variant.

In at least some embodiments, the update by the view model transformation module 360 of the one or more data records associated with the given variant based on the received user interaction signals may be performed using MVVM (model view, view model) techniques. For example, for each edit, the changes to both the variant and the variations underneath the variant (e.g., mappings) are derived and sent to the hierarchical data management server 110 to persist in the tables of FIGS. 2B and/or 2C.

The hierarchical data user interface module 114 of the hierarchical data management server 110 of FIG. 1, in some embodiments, provides the front-end (e.g., a user browser) with the user interface 310 comprising a view of the data in the tables of FIGS. 2B and/or 2C. For example, the hierarchical data management system 300 (e.g., the front-end) can read in data pertaining to variants (e.g., available signals, structure and variations) and aggregate the variant data in a manner that can be presented in the user interface 310 (which may not be a direct view, but rather an intermediate representation (sometimes referred to as a view model)). As noted above, the user interactions with the user interface 310 are communicated by the view model transformation module 360 to the hierarchical data management server 110 for persistent storage in the tables of FIGS. 2B and/or 2C.

Figure 4:
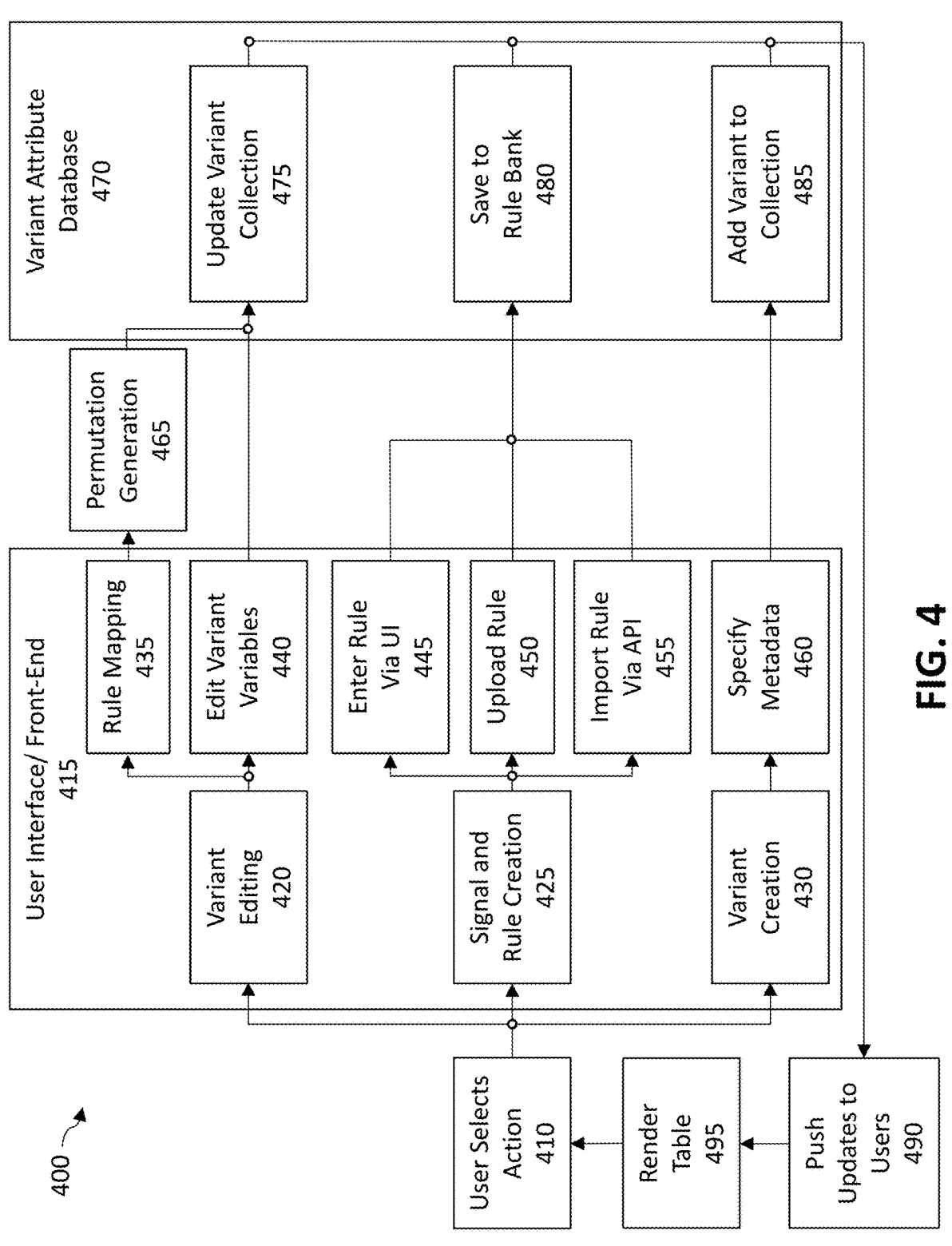
FIG. 4 is a flow diagram illustrating an exemplary implementation of a process for configuration and storage of hierarchical data, according to an embodiment of the disclosure.

FIG. 4 is a flow diagram illustrating an exemplary implementation of a process 400 for configuration and storage of hierarchical data, according to an embodiment of the disclosure. In the example of FIG. 4, the process starts at step 410, where one or more users select one of three available actions to perform within a user interface/front-end 415. The available actions comprise variant editing 420, signal and rule creation 425 and variant creation 430. If the user selects the variant editing 420 action (e.g., adding and/or removing rules or characteristics of the outcome, such as building a schedule for content-related variants), the user may perform rule mapping (e.g., assigning or unassigning rules) in step 435 or may edit variant variables in step 440.

A permutation generation may be performed in step 465 which may, for example, expand the summary table of FIG. 2C, having one record for each variant, into the more detailed table of FIG. 2B, having one or more permutation records for each variant. In addition, the permutation generation performed in step 465 may comprise populating placeholders in a permutation template with values specified from a data feed (e.g., populating a SKU (stock keeping unit) placeholder with different SKU values). In this manner, the permutation generation connects data feeds, referenced using macro programs, thereby allowing each variant to comprise hundreds or thousands of different permutations (generated by the content in the data feed), all contained within a single row in the user interface 415, in at least some embodiments.

The outputs of edit variant variables step 440 and the permutation generation step 465 are processed in step 475 to update the variant collection in the variant attribute database 470.

If the user selects the signal and rule creation 425 action, the user may elect to enter one or more rules in step 445 using the user interface 415, upload one or more rules in step 450 and/or import one or more rules using one or more third-party application programming interfaces (APIs) in step 455. The connections to the third-party APIs allow existing objects in other platforms to be pulled in automatically to create signal rules in tables of FIGS. 2B and/or 2C. In addition, in some embodiments, extraneous (e.g., uninformative) information imported using the APIs may be removed from the human-readable rule identifiers. One or more aspects of the disclosure recognize that third-party platforms frequently utilize complex naming conventions including information that is redundant for users of the disclosed systems for configuration and storage of hierarchical data (e.g., variant data). By identifying values that are common across all rule identifiers, or otherwise uninformative, the common values can be identified and removed, leaving only the information pertinent to the rule itself. For example, a number of occurrences of common values can be compared to a threshold, or a set of rules and/or patterns can be derived to recognize the common values.

The outputs of steps 445, 450 and 455 are processed in step 480 to save rules to the rule bank of the variant attribute database 470.

If the user selects the variant creation 430 action, the user can specify the corresponding metadata in step 460, and the variant can be added in step 485 to the variant collection in the variant attribute database 470.

The outputs of steps 475, 480 and 485 are pushed as updated in step 490 to users, and the tables of FIGS. 2B and/or 2C are rendered in step 495. Program control returns to step 410 allowing the users to again select another action.

FIG. 5 illustrates exemplary pseudo code for a permutation generation process 500, according to one embodiment of the disclosure. The permutation generation process 500 is performed when rule mappings change for a variant and comprises determining whether the variant employs a macro program and data source. For each rule, and for each data item, the permutation generation process 500 creates an output permutation for the tuple comprising the current variant, data item and rule. Otherwise, if a macro program and data source are not employed, for each rule, the permutation generation process 500 creates an output permutation for the tuple comprising the current variant and rule.

While one or more embodiments are discussed herein in the context of configuration and storage of content-related variants, the disclosed hierarchical data management techniques may be employed to manage any variants having multiple attributes, such as variants comprising particular product models having different variations (e.g., a sneaker model having different sneaker sizes, colors, and target audience) or a logistics, shipping or other supply chain application (e.g., where the variants may be different delivery plans, such as transport mechanisms and transit itineraries, and the signals comprise components of the journey, such as the number of signals being equal to the number of legs of the journey), as would be apparent to a person of ordinary skill in the art. In another example, a particular fragrance product may be sold in multiple sizes or formats, and a number of features of the fragrance product are the same, such as the packaging, manufacturing location and ingredients.

The signals in a product-related variant example comprise those product characteristics that apply across multiple product models as decisioning criteria across the range of product models, such as target customer demographics, promotional availability, retailer, and distribution. The variant variables in a product-related variant example comprise the particular scent of a fragrance or the different formats, such as different sizes (e.g., variations within a master variant), while some of the metadata may be the same across the variations.

Figure 6:
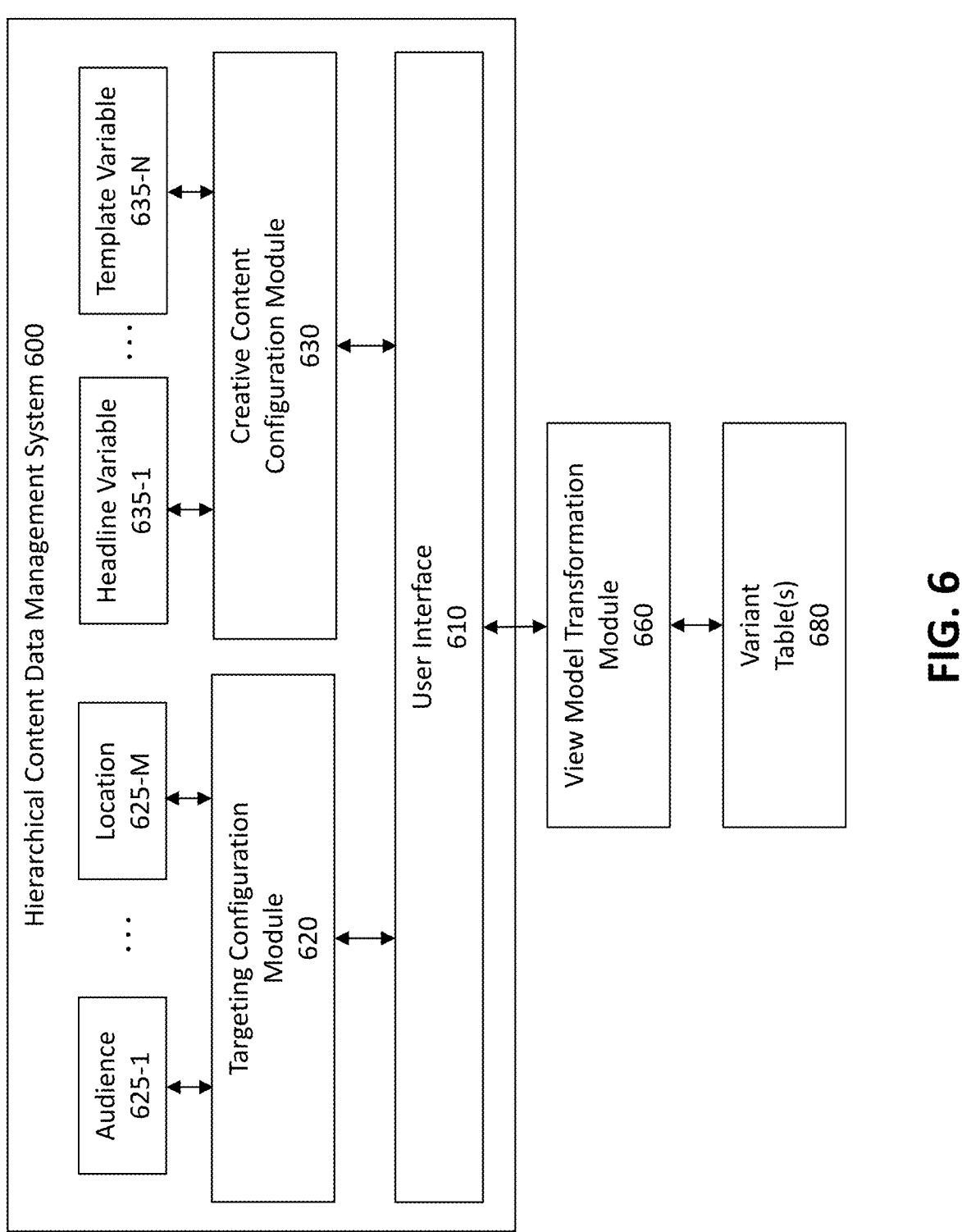
FIG. 6 illustrates a hierarchical content data management system for use with content-related variants in accordance with an exemplary embodiment of the disclosure.

FIG. 6 illustrates a hierarchical content data management system 600 for use with content-related variants in accordance with an exemplary embodiment of the disclosure. In the example of FIG. 6, the hierarchical content data management system 600 comprises a user interface 610 that allows a user to configure a given content-related variant, in a front-end, by specifying: (i) an audience signal 625-1 (e.g., user segments for a given content-related variant), a location signal 625-M (e.g., where to present the content-related variants) and possibly additional signals associated with the given content-related variant (for example, to specify where and when a given content-related variant should be presented as part of the targeting the given content-related variant) via a targeting configuration module 620; and (ii) a headline variable 635-1, a template variable 635-N and possibly additional variables comprising characteristics of the given content-related variant (for example, to specify the particular content of a given content-related variant) via a creative content configuration module 630. For example, a user may configure the one or more signals 625-1 through 625-M by specifying one or more rules or rule values for each signal.

In some embodiments, the user interface 610 receives user interaction signals with the user interface 610 to configure the given content-related variant. The user interface 610 initiates an update by a view model transformation module 660 of one or more data records associated with the given content-related variant based on the received user interaction signals. The rule values specified for the one or more signals 625-1 through 625-M associated with the given content-related variant are stored in the one or more data records of one or more variant tables 680 as attributes of the given content-related variant.

In at least some embodiments, the update by the view model transformation module 660 of the one or more data records associated with the given content-related variant based on the received user interaction signals may be performed using MVVM (model view, view model) techniques. For example, for each edit, the changes to both the content-related variant and the variations underneath the content-related variant (e.g., mappings) are derived and sent to the hierarchical data management server 110 to persist in the tables of FIGS. 2B and/or 2C.

The hierarchical data user interface module 114 of the hierarchical data management server 110 of FIG. 1, in some embodiments, provides the front-end (e.g., a user browser) with the user interface 610 comprising a view of the data in the tables of FIGS. 2B and/or 2C. For example, the hierarchical content data management system 600 (e.g., the front-end) can read in data pertaining to content-related variants (e.g., available signals, structure and variations) and aggregate the content-related variant data in a manner that can be presented in the user interface 610 (which may not be a direct view, but rather an intermediate representation (sometimes referred to as a view model)). As noted above, the user interactions with the user interface 610 are communicated by the view model transformation module 660 to the hierarchical data management server 110 for persistent storage in the tables of FIGS. 2B and/or 2C.

In the example of FIG. 6, the targeting development, via the targeting configuration module 620, and the creative content development, via the creative content configuration module 630, of the campaign development platform are accessible to one or more users through a common user interface 610. The user interface 610 allows users to interact with a view of individual rows of the tables of FIGS. 2B and/or 2C. In this manner, a user may edit and update content associated with campaigns using the creative content configuration module 630.

The user interface 610 has access to a view of the content-related variant data stored in the tables of FIGS. 2B and/or 2C that store targeting information specified as audience signals 625-1 and channel information specified as location signals 625-M. In addition, a user can access the creative content through the user interface 610 to update one or more content-related variants (e.g., individual content items), including headline variables 635-1, images and template variables 635-N. The updated content may be stored in the one or more variant tables 680.

FIG. 7 illustrates an exemplary user interface 700 for configuration and storage of content-related variant data, according to one embodiment of the disclosure. In the example of FIG. 7, for a given variant 710, a row of the user interface 700 allows a user to specify (e.g., select from one or more available options) audience segments and a schedule (e.g., channel locations) for a targeting strategy using signals 730, as well as whether the given variant 710 is enabled (e.g., on/off) and allows the user to view performance data 720. The signals 730 may have one or more rules in some embodiments, with the rules being assigned to the content-related variants to describe when and where each content-related variant should be shown. A user may also specify the content of the given content-related variant by selecting the background, headline, image, image2, subheadline and sub-headline2 using the frame options 740. As noted above in conjunction with FIG. 4, the frame options 740 may be specified by a user using the user interface 700 in step 445, uploaded in step 450 or imported using an API in step 455. The specified frame options 740 comprise the variant variables in the tables of FIGS. 2B and 2C.

In addition, each content-related variant may have multiple formats. For example, the "Alpha" variant has a "300×600" pixel format and a "970×250" pixel format. The different formats are examples of different permutations of the same variant. If a user selects a particular variant format (for example, by clicking on the desired format) additional options related to the selected format may be presented in other columns of the same row of the user interface 700.

In this manner, the user interface 700 allows a user to specify both the targeting strategy using signals 730 and the given content-related variant itself using the frame options 740 in one place.

As noted above, the user interactions with the user interface 700 can be communicated (for example, by the view model transformation module 660 of FIG. 6) to the hierarchical data management server 110 of FIG. 1 for persistent storage in the tables of FIGS. 2B and/or 2C.

The user interface 700 may also provide functionality to allow a user to create a new variant by cloning (e.g., copying) and editing an existing variant that has been specified by a user.

FIG. 8 is a sample table that may be employed to record user segment data (e.g., signal 1) in a mapping database 800 in accordance with an embodiment of the disclosure. For each segment identifier that is available in the user interface 700 of FIG. 7 (e.g., segments 1, 2 and 3) a corresponding description of the segment is provided.

FIG. 9 is a sample table that may be employed to record schedule data (e.g., signal 2) in a mapping database 900 in accordance with an embodiment of the disclosure. For each schedule identifier that is available in the user interface 700 of FIG. 7 (e.g., schedules A, B and C) a corresponding description of the schedule is provided.

FIG. 10 is a flow diagram illustrating an exemplary implementation of a process 1000 for configuration and storage of hierarchical data, according to an embodiment of the disclosure. In the example of FIG. 10, a user interface is provided in step 1010 to configure respective ones of a plurality of different variants, wherein a configuration of a given variant comprises a specification of one or more signals associated with the given variant, wherein a given signal comprises one or more rules. One or more representations of user interactions with the user interface are obtained in step 1020 to configure the given variant.

An update is initiated in step 1030 of at least one database table comprising one or more records associated with the given variant based at least in part on the one or more representations of the user interactions, wherein the at least one database table stores rule values specified for the one or more signals associated with the given variant as attributes of the given variant. At least one automated action is initiated in step 1040 using the at least one database table.

In some embodiments, the given variant comprises one or more variant variables comprising characteristics of the given variant and wherein the at least one database table stores values specified for the one or more variant variables associated with the given variant as attributes of the given variant. A function may be applied to each permutation of the given variant, signal configuration for the respective permutation, rule configuration for the respective permutation and variant variable configuration for the respective permutation, and wherein a value generated by the function is stored in the at least one database table as an identifier of the respective permutation. The one or more of the variant variables may be automatically populated from at least one data feed referenced using one or more macro programs and/or the user interface may be employed to configure the one or more variant variables. One or more selection options presented to at least one user in the user interface for configuring the one or more variant variables may be constrained based at least in part on the configuration by the at least one user of one or more of the one or more signals and the one or more rules.

In one or more embodiments, the one or more of the rules are configured by importing one or more data objects using an application programming interface (API) of a third-party system. The one or more data objects may have corresponding human-readable identifiers and at least a portion of at least some of the human-readable identifiers may be reduced based at least in part on one or more informational content thresholds.

In at least some embodiments, the given variant comprises a content item, wherein the content item is presented to an audience based on a configuration of a user segment signal and a configuration of a schedule signal, and wherein one or more variant variables comprise characteristics of the content elements of the content item.

The particular processing operations and other functionality described in conjunction with FIGS. 4 and 10, for example, are presented by way of example, and should not be considered as limiting the scope of the disclosure. For example, additional operations can be performed. Different arrangements can use other types and orders of operations to configure and store hierarchical data. For example, the ordering of the operations may be changed in other embodiments, or one or more operations may be performed in parallel with one or more other operations.

In some embodiments, the disclosed techniques for configuration and storage of hierarchical data, such as hierarchical variant data, improve the performance, efficiency, utilization and/or management of such hierarchical data. One or more embodiments of the disclosure provide methods, systems and processor-readable storage media for configuration and storage of hierarchical data. The embodiments described herein are illustrative of the disclosure, and other embodiments can be configured using the disclosed techniques for configuration and storage of hierarchical data.

The disclosed hierarchical data management techniques can be implemented using one or more programs stored in memory and executed by a processor of a processing device or platform. One or more of the processing modules and other components described herein may each be executed on a computing device or another element of a processing platform.

Among other benefits, the disclosed techniques for configuration and storage of hierarchical data mitigate the multiple types of duplication and user interface inefficiency described above in conjunction with FIG. 2A. By allowing multiple rules per signal to be assigned to each variant (e.g., outcome), the complex and inefficient decision tree structure shown in FIG. 2A is abstracted away from the user interface of FIG. 7 and replaced with a tabular structure, such as those shown in FIGS. 2B and 2C. In this manner, a more scalable and easy-to-manage user experience is provided. Scalability is significantly improved by the way in which the variant information is laid out in the user interface.

In addition, the increased efficiency of space opens the opportunity in some embodiments to manage variant variables associated with a respective variant within the same user interface that configures the variants, creating additional operational efficiencies as multiple tasks can be carried out simultaneously in the same interface. Indeed, managing these tasks all in the same interface opens up the ability for input variables to be constrained or otherwise adjusted based on the applied signals. For example, if signal 1, rule 1 requires a process outcome that is in some way limited at a variable level (say, it has to occur within a certain subset of locations), then the values available to the user for selection can be automatically constrained accordingly.

To add another layer of incremental scalability, each row (or variant) may contain within it nested variations, to accommodate different formats or other permutations of the same variant. Examples could be different package sizes for the same product, or different pixel formats for the same creative asset.

Figure 11:
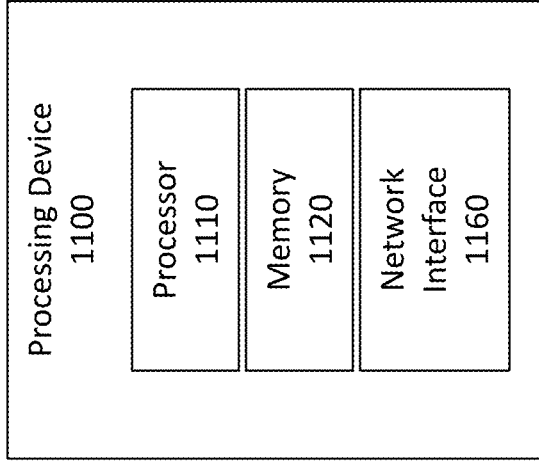
FIG. 11 illustrates an exemplary processing device that may implement one or more portions of at least one embodiment of the disclosure.

FIG. 11 illustrates an exemplary processing device 1100 that may implement one or more portions of at least one embodiment of the disclosure. The processing device 1100 in the example of FIG. 11 comprises a processor 1110, a memory 1120 and a network interface 1160. The processor

1110 may comprise a microprocessor, a microcontroller, an ASIC, an FPGA and/or other processing circuitry. The memory 1120 is one example of a processor-readable storage media that stores executable code of one or more software programs. The network interface circuitry 1160 is used to interface the processing device with one or more networks, such as the communication network 150 of FIG. 1, and other system components, and may comprise one or more transceivers.

One or more embodiments include articles of manufacture, such as computer or processor-readable storage media. Examples of an article of manufacture include, without limitation, a storage device such as a storage disk, a storage array or an integrated circuit comprising memory, as well as a wide variety of other types of computer program products. The term "article of manufacture" shall not include transitory, propagating signals.

Cloud infrastructure comprising virtual machines, containers and/or other virtualized infrastructure and/or cloud-based services may be used to implement at least portions of the disclosed techniques for hierarchical data management.

FIG. 12 illustrates an exemplary cloud-based processing platform 1200 in which cloud-based infrastructure and/or services can be used to configure and store hierarchical data, according to an exemplary embodiment. The cloud-based processing platform 1200 comprises a combination of physical and/or virtual processing resources that may be utilized to implement at least a portion of the disclosed techniques for hierarchical data management. The cloud-based processing platform 1200 comprises one or more virtual machines and/or containers 1220 implemented using a virtualization framework 1230. The virtualization framework 1230 executes on a physical framework 1240, and illustratively comprises one or more hypervisors and/or operating system-level virtualization framework.

The cloud-based processing platform 1200 further comprises one or more applications 1210 running on respective ones of the virtual machines and/or containers 1220 under the control of the virtualization framework 1230. The virtual machines and/or containers 1220 may comprise one or more virtual machines, one or more containers, or one or more containers running in one or more virtual machines.

The virtual machines and/or containers 1220 may comprise one or more virtual machines implemented using virtualization framework 1230 that comprises one or more hypervisors. In this manner, hierarchical data management functionality can be provided for one or more processes running on a given virtual machine.

The virtual machines and/or containers 1220 may comprise one or more containers implemented using virtualization framework 1230 that provides operating system-level virtualization functionality, for example, that supports Docker containers. In this manner, hierarchical data management functionality can be provided for one or more processes running on one or more of the containers.

Multiple elements of an information processing system may be collectively implemented on a common processing platform of the type shown in FIGS. 11 and/or 12, or each such element may be implemented on a separate processing platform. It is noted that other arrangements of computers, host device, storage devices and/or other components may be employed in other embodiments.

Thus, the embodiments described herein are presented for illustration and a number of variations and other alternative embodiments may be used, as would be apparent to a person of ordinary skill in the art. In addition, the particular configurations of system and device elements, as well as associated processing operations, shown in the presented figures may be modified in other embodiments. Numerous other embodiments within the scope of the following claims would be apparent to those of ordinary skill in the art.

What is claimed is:

1. A method, comprising:
providing a user interface to configure values of one or more configurable characteristics, of respective ones of a plurality of different configurable variants, to be stored in at least one database table, wherein a configuration of a given configurable variant comprises a specification of one or more signals associated with the given configurable variant, wherein a given signal comprises one or more rules, wherein the one or more signals and the one or more rules associated with the given configurable variant comprise the configurable characteristics of the given configurable variant;
obtaining one or more representations of user interactions with the user interface to configure the one or more of the signals associated with the given configurable variant by specifying at least one value, of the one or more rules for the one or more of the signals, associated with the given configurable variant, to be stored in the at least one database table;
initiating an update of the at least one database table, comprising one or more records associated with the given configurable variant, based at least in part on the one or more representations of the user interactions, wherein the at least one database table stores the at least one value of the one or more rules specified for the one or more signals associated with the given configurable variant in a tabular format as attributes of the given configurable variant; and
initiating at least one automated action using the at least one database table;
wherein the method is performed by at least one processing device comprising a processor coupled to a memory.

2. The method of claim 1, wherein the given configurable variant comprises one or more variant variables comprising characteristics of the given configurable variant and wherein the at least one database table stores values specified for the one or more variant variables associated with the given configurable variant as attributes of the given configurable variant.

3. The method of claim 2, further comprising applying a function to each permutation of the given configurable variant, signal configuration for the respective permutation, rule configuration for the respective permutation and variant variable configuration for the respective permutation, and wherein a value generated by the function is stored in the at least one database table as an identifier of the respective permutation.

4. The method of claim 2, wherein one or more of the variant variables are automatically populated from at least one data feed referenced using one or more macro programs.

5. The method of claim 2, wherein the user interface is employed to configure the one or more variant variables.

6. The method of claim 5, wherein one or more selection options presented to at least one user in the user interface for configuring the one or more variant variables are constrained based at least in part on the configuration by the at least one user of one or more of the one or more signals and the one or more rules.

7. The method of claim 1, wherein the database table comprises one data record for the given configurable variant, wherein the one or more signals and the one or more rules are expressed as attributes of the given configurable variant.

8. The method of claim 1, wherein one or more of the rules are configured by importing one or more data objects using an application programming interface (API) of a third-party system.

9. The method of claim 8, wherein the one or more data objects have corresponding human-readable identifiers and further comprising reducing at least a portion of at least some of the human-readable identifiers based at least in part on one or more informational content thresholds.

10. The method of claim 1, wherein the at least one automated action comprises one or more of generating the given configurable variant and providing the given configurable variant to a third-party system.

11. The method of claim 1, wherein the given configurable variant comprises a content item, wherein the content item is presented to an audience based on a configuration of a user segment signal and a configuration of a schedule signal, and wherein one or more variant variables comprise characteristics of content elements of the content item.

12. An apparatus comprising:

at least one processing device comprising a processor coupled to a memory;

the at least one processing device being configured to implement the following steps:

providing a user interface to configure values of one or more configurable characteristics, of respective ones of a plurality of different configurable variants, to be stored in at least one database table, wherein a configuration of a given configurable variant comprises a specification of one or more signals associated with the given configurable variant, wherein a given signal comprises one or more rules, wherein the one or more signals and the one or more rules associated with the given configurable variant comprise the configurable characteristics of the given configurable variant;

obtaining one or more representations of user interactions with the user interface to configure the one or more of the signals associated with the given configurable variant by specifying at least one value, of the one or more rules for the one or more of the signals, associated with the given configurable variant, to be stored in the at least one database table;

initiating an update of the at least one database table, comprising one or more records associated with the given configurable variant, based at least in part on the one or more representations of the user interactions, wherein the at least one database table stores the at least one value of the one or more rules specified for the one or more signals associated with the given configurable variant in a tabular format as attributes of the given configurable variant; and initiating at least one automated action using the at least one database table.

13. The apparatus of claim 12, wherein the given configurable variant comprises one or more variant variables comprising characteristics of the given configurable variant and wherein the at least one database table stores values specified for the one or more variant variables associated with the given configurable variant as attributes of the given configurable variant.

14. The apparatus of claim 12, wherein the database table comprises one data record for the given configurable variant, wherein the one or more signals and the one or more rules are expressed as attributes of the given configurable variant.

15. The apparatus of claim 12, wherein the at least one automated action comprises one or more of generating the given configurable variant and providing the given configurable variant to a third-party system.

16. The apparatus of claim 12, wherein the given configurable variant comprises a content item, wherein the content item is presented to an audience based on a configuration of a user segment signal and a configuration of a schedule signal, and wherein one or more variant variables comprise characteristics of content elements of the content item.

17. A non-transitory processor-readable storage medium having stored therein program code of one or more software programs, wherein the program code when executed by at least one processing device causes the at least one processing device to perform the following steps:

providing a user interface to configure values of one or more configurable characteristics, of respective ones of a plurality of different configurable variants, to be stored in at least one database table, wherein a configuration of a given configurable variant comprises a specification of one or more signals associated with the given configurable variant, wherein a given signal comprises one or more rules, wherein the one or more signals and the one or more rules associated with the given configurable variant comprise the configurable characteristics of the given configurable variant;

obtaining one or more representations of user interactions with the user interface to configure the one or more of the signals associated with the given configurable variant by specifying at least one value, of the one or more rules for the one or more of the signals, associated with the given configurable variant, to be stored in the at least one database table;

initiating an update of the at least one database table, comprising one or more records associated with the given configurable variant, based at least in part on the one or more representations of the user interactions, wherein the at least one database table stores the at least one value of the one or more rules specified for the one or more signals associated with the given configurable variant in a tabular format as attributes of the given configurable variant; and initiating at least one automated action using the at least one database table.

18. The non-transitory processor-readable storage medium of claim 17, wherein the given configurable variant comprises one or more variant variables comprising characteristics of the given configurable variant and wherein the at least one database table stores values specified for the one or more variant variables associated with the given configurable variant as attributes of the given configurable variant.

19. The non-transitory processor-readable storage medium of claim 17, wherein the database table comprises one data record for the given configurable variant, wherein the one or more signals and the one or more rules are expressed as attributes of the given configurable variant.

20. The non-transitory processor-readable storage medium of claim 17, wherein the given configurable variant comprises a content item, wherein the content item is presented to an audience based on a configuration of a user segment signal and a configuration of a schedule signal, and wherein one or more variant variables comprise characteristics of content elements of the content item.

* * * * *